(12) United States Patent
Ejiri

(10) Patent No.: US 6,434,643 B1
(45) Date of Patent: Aug. 13, 2002

(54) TRANSMISSION OF STATUS INFORMATION BY A SELECTED ONE OF MULTIPLE TRANSFER MODES BASED ON THE CAUSE FOR SENDING THE STATUS INFORMATION

(75) Inventor: Keigo Ejiri, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/291,921

(22) Filed: Apr. 14, 1999

(30) Foreign Application Priority Data

Apr. 15, 1998 (JP) .......................................... 10-104977

(51) Int. Cl.[7] .............................................. G06F 3/00
(52) U.S. Cl. .............................. 710/58; 710/25; 710/33; 710/60; 713/600
(58) Field of Search ................................ 710/58, 7, 15, 710/31, 33, 61, 4, 20, 60, 131, 25, 35; 713/400, 600

(56) References Cited

U.S. PATENT DOCUMENTS

| | | | |
|---|---|---|---|
| 4,809,217 A | * 2/1989 | Floro et al. ................... 364/900 |
| 5,038,275 A | * 8/1991 | Dujari ......................... 364/200 |
| 5,065,314 A | * 11/1991 | Maskovyak .................. 395/325 |
| 5,097,410 A | * 3/1992 | Hester et al. ................ 395/275 |
| 5,287,523 A | * 2/1994 | Allison et al. ............... 395/725 |
| 5,313,584 A | * 5/1994 | Tickner et al. .............. 395/275 |
| 5,459,870 A | * 10/1995 | Iwasa et al. ................. 710/261 |
| 5,566,351 A | * 10/1996 | Crittenden et al. ........... 710/47 |
| 5,987,526 A | * 11/1999 | Morales ....................... 709/249 |
| 6,088,346 A | * 7/2000 | Du et al. ..................... 370/338 |

FOREIGN PATENT DOCUMENTS

| | | |
|---|---|---|
| EP | 0 363 087 | 4/1990 |
| JP | 61-150434 | 7/1986 |

OTHER PUBLICATIONS

Quinnell, Richard A., "*USB: A Neat Package With a Few Loose Ends*", EDN Electrical Design News, vol. 41, No. 22, Oct. 24, 1996, pp 38–46, 48 & 52.

* cited by examiner

Primary Examiner—Jeffrey Gaffin
Assistant Examiner—Mai Rijue
(74) Attorney, Agent, or Firm—Michael T. Gabrik

(57) ABSTRACT

A peripheral device and peripheral device control method assure the immediacy of status information while opening the greatest possible bandwidth when communicating status information using a USB interface enabling simultaneous access to a plurality of peripheral devices. A first transfer function enables sending status information to a peripheral device such as a printer using the USB bulk transfer type, and a second transfer function enables sending status information using the USB interrupt transfer type. Status information sent in response to a host request where the host can control the timing of status information transfers is sent by bulk transfer using the first transfer function, thereby assuring bandwidth for bulk transfers. Autonomous status information communicated at a timing unknown to the host is communicated by the second transfer function using the short transfer period interrupt transfer type, thereby assuring the immediate communication of the status information.

14 Claims, 3 Drawing Sheets

TRANSMISSION OF STATUS INFORMATION BY A SELECTED ONE OF MULTIPLE TRANSFER MODES BASED ON THE CAUSE FOR SENDING THE STATUS INFORMATION

BACKGROUND OF THE INVENTION

1. Field of the Invention

The present invention relates to a peripheral device such as a printer or scanner capable of communicating with a host device, and to a control method for the peripheral device.

2. Description of the Related Art

The Universal Serial Bus (simply referred to as "USB" below) is an interface for connecting and enabling the exchange of user and control data between peripheral devices, such as printers and scanners, and a host such as a personal computer. It is rapidly becoming the standard interface for connecting such peripheral devices (sometimes called "device(s)" below) to a personal computer (simply called "PC" below).

More specifically, USB is a bus standard for a serial cable connection enabling a PC to simultaneously access numerous devices with high data reliability while also enabling "hot swapping", the ability to insert and remove devices on the USB chain while the host and/or other devices are operating without losing access to the devices that remain on the bus. Because of this combination of high data reliability and hot swapability, USB is expected to become the industry-standard interface for PC peripheral connections.

Data transmission between USB interface devices begins when the host sends a token packet to a device. To enable simultaneous access to a plurality of devices, the token packet contains a unique device address and device endpoint. The address identifies which device on the USB is being addressed, and the endpoint identifies the source of the data or data transfer, or the data recipient or consumer (sink). Following the token packet comes a data packet containing the data being communicated, and a handshake packet indicating the transfer status.

USB uses the following four data transfer types, and transfers data by establishing a corresponding logical "pipe" between the host and device.

Bulk transfers, and the bulk transfer pipe, are used for sending relatively large amounts of data, such as print and display data.

Interrupt transfers, and the interrupt transfer pipe, are used for small amounts of data with a short service period.

Control transfers, and the control transfer pipe, are used when a device is first connected to the bus to construct a logical device presence.

Isochronous transfers, and the isochronous transfer pipe, are used for audio and other types of data requiring data to be delivered within certain time constraints.

Sending a data stream in any of these transfer modes is called a "transaction," and comprises the above-described packet sequence.

Frames sent at 1 ms intervals contain a plurality of transactions. Simultaneous communication between a host and multiple devices is achieved by sending these frames in succession.

The handshake packet provides a retry function in case an error occurs during transmission, thereby enabling large amounts of data to be reliably transferred at high speed.

When the USB device communicating with the host is a printer, for example, data communicated between the host and the printer includes status information indicating the operating status of the printer, in addition to process data such as bitmap data or other print data and control commands for controlling the printing mechanism. Typical status information includes the on-line or off-line status of the printer, whether there is paper, whether the cover is open, if the buffer is full, whether there is ink, and any error status. The status information is normally sent from the printer to the host in response to a status request command, and is therefore sent to the host using the same bulk transfer type that is used to send print and command data from the host to the printer.

A USB bulk transfer pipe is only opened, however, when the bus capacity (bandwidth) needed to transfer the data within a specific unit time is available; therefore there is no way to assure when the data will be sent. This means that information may not be transferred immediately when status information is transferred using a bulk transfer pipe, and various problems can result. For example, the host may continue sending process data even though the buffer is full, and data may therefore be lost. The host may also continue sending data even though the printer cover is open, and printing delays may thus occur.

The interrupt transfer pipe, on the other hand, is opened at regular short intervals, enabling a device to send data to the host immediately if there is data to send when the device is polled. The interrupt transfer pipe is thus assured the highest level of service, providing good real-time performance. Data reliability is also extremely high because the transfer is retried at the next period if a bus error occurs and a transaction is lost. It is therefore possible to send status information using the interrupt transfer type, and thereby assure both immediacy and data reliability.

However, the size of the data packets that can be sent by interrupt transfer is limited in order to assure bandwidth availability. It is also preferable to release bandwidth for bulk transfers in order to maintain an acceptable transfer speed for process data. As a result, it is also desirable to limit data transfers using the interrupt transfer pipe.

SUMMARY OF THE INVENTION

An object of the present invention is therefore to provide a peripheral device and a control method therefor whereby the immediacy of status information transfers can be assured, bandwidth sufficient for efficient transfer of process data and commands can be assured, and a high data transfer rate can be assured.

To achieve the above object, a peripheral device according to the present invention assures immediate, real-time response while maximizing bandwidth available for bulk transfers by selectively transferring status information using a bulk transfer pipe or an interrupt transfer pipe according to the type of status information rather than simply sending all status information by either bulk transfer or interrupt transfer pipe.

More specifically, a peripheral device according to the present invention comprises a transmission unit for exchanging data with a host and for sending to the host status information indicative of an operating condition of the peripheral device. The transmission unit has an interface for sending data to and receiving data from the host. The interface can send and receive data by at least two transfer modes. A first transfer mode corresponds to the bulk transfer type of the USB interface, that is, a transfer mode in which data sending and receiving are enabled based on an input/output command sent from the host when transfer time has been reserved. A second transfer mode corresponds to the interrupt transfer type of the USB interface, that is, a transfer mode in which data sending and receiving are enabled based on an input/output command sent at a regular interval from the host. The status transmission unit has a first transfer function for sending status information by the first transfer mode, a second transfer function for sending status information by the second transfer mode, and a selecting function for selecting the first or second transfer function according to the cause for sending the status information.

A peripheral device control method according to the present invention is also provided. Status information indicative of an operating condition of the peripheral device is detected in a detecting step. In a selecting step, a first or second transfer mode is selected according to the cause for sending status information to a host. In the first transfer mode, data sending and receiving are enabled in response to an input/output command sent from the host when transfer time has been reserved. In the second transfer mode, data sending and receiving are enabled in response to an input/output command sent at a regular interval from the host. A first transfer step sends status information to the host by means of the first transfer mode if that mode is selected in the selecting step, and a second transfer step sends status information to the host by means of the second transfer mode if that mode is selected in the selecting step.

This peripheral device control method may be provided as a control program of instructions recorded on a device readable medium where the control program includes instructions or commands for execution by the peripheral device to perform the steps of the control method.

A peripheral device and peripheral device control method according to the present invention can thus send status information in response to a request from the host using the first transfer function or first status transfer step, and can send autonomously generated status information by the second transfer function or second status transfer step. As a result, status information requiring immediate communication can be sent immediately by the second transfer function, and status information not requiring immediate communication can be sent by the first transfer function.

More specifically, most cases in which status information is sent in response to a request from the host are cases in which the next process is executed after the requested status information is confirmed by the host, and immediate response is not as necessary. Furthermore, when the requested status information is urgently required, the host knows that the status information is urgent, and can therefore obtain the required status information at the appropriate timing using the first transfer mode such as a bulk transfer pipe in the case of the USB.

On the other hand, the host does not know when status information is autonomously generated by the peripheral device, and this autonomous status information is therefore urgent. The urgency and timely transfer of such autonomous status information can be assured in this case by sending it to the host using the second transfer mode such as an interrupt transfer pipe in the case of the USB.

When status information is thus communicated through an interface using at least two different transfer pipes, as does the USB, a peripheral device and peripheral device control method according to the present invention transfers only status information of the greatest urgency (immediacy) using the second transfer mode, that is, the transfer mode having the shortest service period (such as the USB interrupt transfer pipe), and uses the first transfer mode (such as the USB bulk transfer pipe) to send status information in all other cases.

It is therefore possible to transfer status information using a transfer mode appropriate to the immediacy of the information, thereby transferring status information without occupying unnecessary USB bandwidth, and thus assuring sufficient transmission speed for process data using a bulk transfer pipe.

It is therefore possible to sufficiently assure the immediacy of status information without impairing the performance of a peripheral device having a processing mechanism such as a printing mechanism or reading mechanism for outputting data to or inputting data from an external source, and a controller for sending or receiving process data processed by this processing mechanism by the first transfer mode.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

Figure 1:
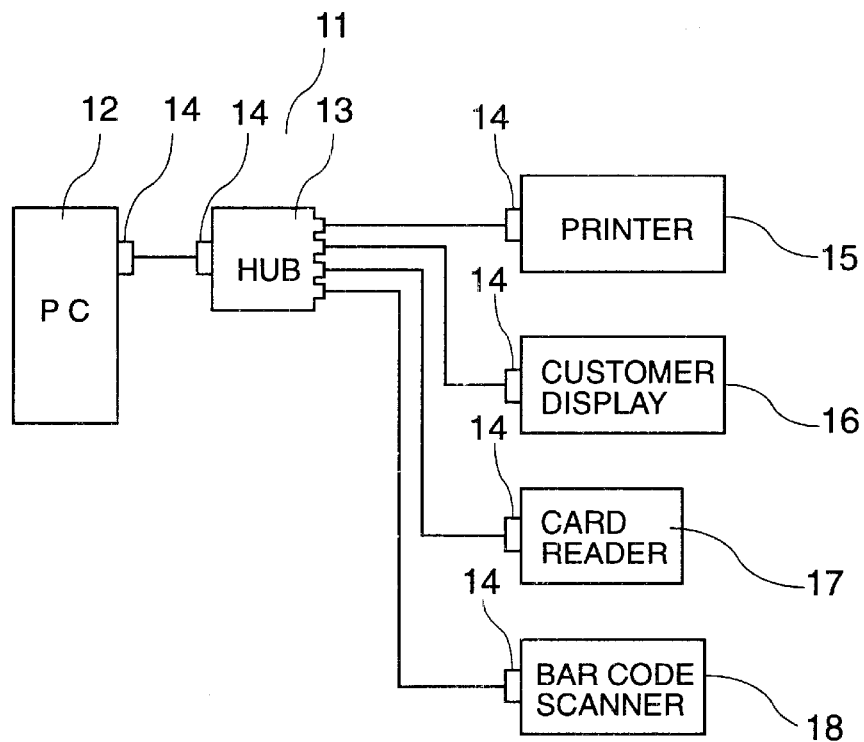
FIG. 1 is a block diagram of a POS system according to a preferred embodiment of the present invention.

The preferred embodiments of the present invention are described below with reference to the accompanying figures. FIG. 1 is a block diagram of a typical POS system 11 in which peripheral devices (USB devices) according to the present invention are interconnected using a USB interface. As shown in FIG. 1, this exemplary POS system 11 comprises a printer 15, customer display 16, card reader 17, and bar code scanner 18 connected to a personal computer host 12 through a hub 13. The printer 15, customer display 16, card reader 17, and bar code scanner 18 each has a USB interface 14 enabling data communication with the host 12 via a USB.

Figure 2:
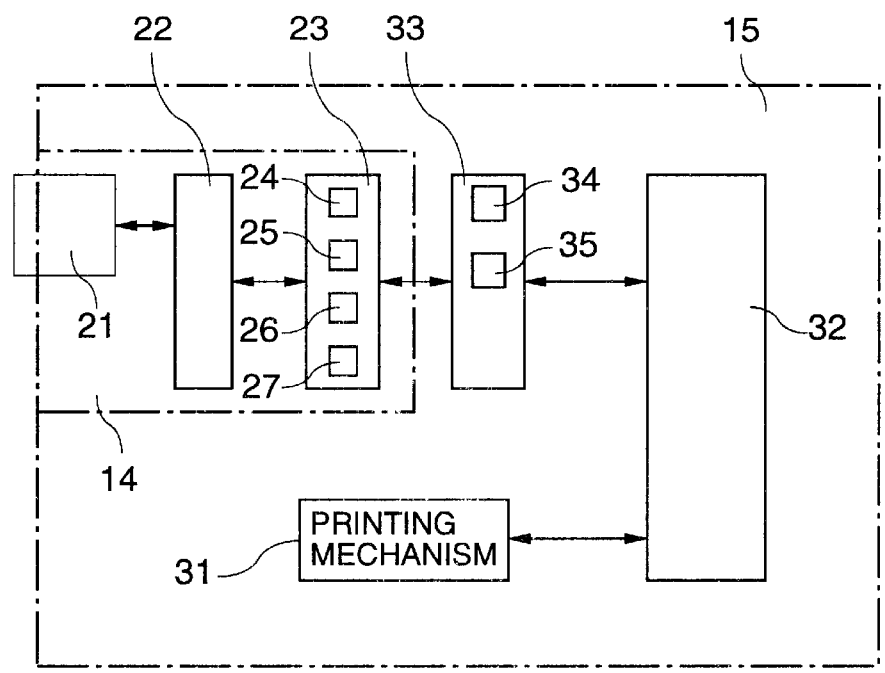
FIG. 2 is a block diagram of the printer shown in FIG. 1.

This preferred embodiment of the invention is described below using the printer 15 as exemplary of any connectable peripheral device. The typical configuration of a printer 15 in this preferred embodiment is described further below with reference to the block diagram in FIG. 2. This printer 15 comprises a printing mechanism 31 for printing, and a program-controlled control device 32 for controlling the printing mechanism 31. The control device 32 typically includes a CPU, a ROM for storing the program and/or various printer setting information, and a RAM as a working buffer for print data and control commands. The CPU, ROM, and RAM are not shown in the figures.

The USB interface 14 is connected by way of client driver 33 to the control device 32. The USB interface 14 comprises a port 21, universal controller 22, and USB driver 23. The port 21 provides the hardware connection environment of the USB interface. The universal controller 22 is for hardware control of communications through the port 21, such as the driving of the signal lines in a predetermined sequence. The USB driver 23 is for software control of the communications such as packetizing of the communicated data. The USB driver 23 includes a CPU, a ROM for storing the program for controlling the CPU to perform the software control, and a RAM as a working buffer. The control device 32 and host 12 thus communicate print data and control commands via the client driver 33 and USB driver 23.

The USB driver 23 comprises a first transfer unit 24 for supporting a bulk transfer pipe; a second transfer unit 25 for supporting an interrupt transfer pipe; a third transfer unit 26 for supporting a control transfer pipe; and a fourth transfer unit 27 for supporting an isochronous transfer pipe.

Figure 3A:
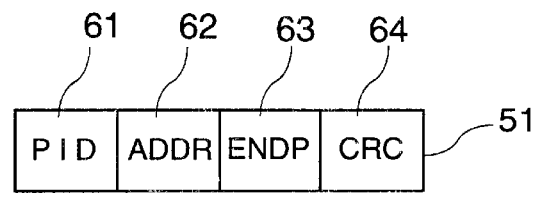
FIG. 3 shows the typical USB packet structure, with FIG. 3(a) showing a token packet, FIG. 3(b) showing a data packet, and FIG. 3(c) showing a handshake packet.
Figure 3B:
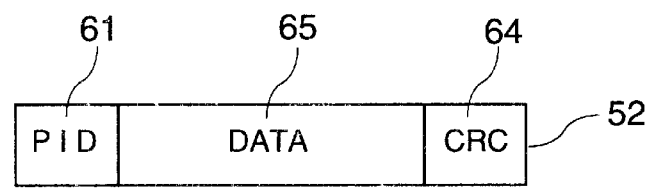
Figure 3C:
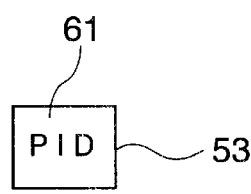

These transfer pipes are opened by a token packet 51 sent from the host 12 as shown in FIG. 3. This token packet 51 comprises: a packet ID (PID) 61 indicative of the packet type, that is, whether the host is to send or receive the data in the data packet; an address 62 for identifying a particular device on the USB; an endpoint 63 indicative of the destination on the device where the data is used or originates; and a cyclic redundancy code (CRC) 64 for error checking.

By thus declaring the address and endpoint in a token packet, and assigning a device for each of the pipes, data can be communicated substantially simultaneously between the host 12 and a plurality of devices using USB interfaces which have plural pipes in a frame. The transaction performed through the pipe is described next.

When data is sent from the host 12, it sends from its USB interface 14 a token packet 51 containing a PID 61 indicating that the host is sending data, the address 62 of the device to which the host 12 is sending data (the address of the printer 15 in this example), and an endpoint 63 indicating the end point of the data on the addressed device, here, the control device 32.

The USB driver 23 decodes the address and endpoint in the token packet 51, and receives a data packet 52 following thereafter if the control device 32 of the printer 15 is identified by the endpoint 63. The data packet 52 contains a PID 61, data 65, and a CRC 64.

Before the host 12 receives data from the printer 15, the host 12 sends to the printer 15 a token packet 51 containing a PID 61 indicating that data is allowed to sent (hereinafter an "IN token"). When this IN token is received by the USB driver 23, it sends the output data or command readied by the control device 32 in a data packet 52.

When data packet 52 sending or receiving is completed, a handshake packet 53 is exchanged.

The handshake packet 53 contains only a PID 61, enabling one of three states to be returned: ACK, acknowledging that the data was received without error; NAK, indicating that the data was not received; and STALL, indicating that the receiving side has stalled (i.e., that data communication is not possible because of some error).

When the host 12 detects a NAK in the handshake packet 53, it is possible to retry sending the same data packet 52 and thus increase the reliability of data transfers. When a STALL is detected, the host can attempt to resolve the cause of the stall through the device.

Figure 4:
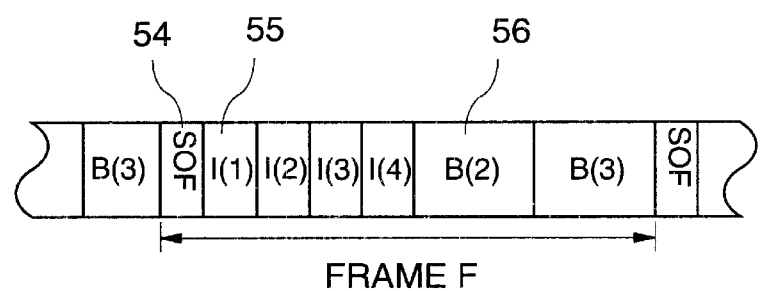
FIG. 4 shows the typical USB frame F structure.

As shown in FIG. 4, the host 12 transfers data in frames (one of which is designated as Frame F) at 1 ms intervals, the frame period of the USB standard (USB time). Frame F starts with a start of frame (SOF) token 54. Following the SOF token 54, interrupt transfer transactions 55, if any, are run. The interrupt transfer period can be set for each device. If it is set to the shortest period for each device, an interrupt transfer transaction 55 is included for each device (four devices in the described example) in each frame, and if there is sufficient room left in frame F, a bulk transfer transaction 56 is included. If data is required to be transferred isochronously, an isochronous transfer transaction follows the interrupt transfer transaction 55.

Packets are exchanged in an interrupt transfer transaction 55 in the same manner as described above for bulk transfers. That is, an IN token 51 is first issued from the host 12, and if a device has data to be sent in response to the IN token 51, it is immediately packed into a data packet 52 and sent. The host responds by sending a handshake packet 53, enabling the device to determine whether the data was received without error. If there is no data to send, the device returns an NAK handshake packet 53 to the host 12, and the host 12 then releases the interrupt transfer pipe opened for that device. As a result, each device is polled by an interrupt transfer transaction 55 at the frame period timing, when the polling time is shortest, and can thus immediately send any data required to the host 12.

Returning to FIG. 2, a printer 15 according to this preferred embodiment also sends status information indicative of the printer status to the host 12 through the USB interface 14. This status information is sent in addition to print data and control commands. Status information detected by the control device 32 is thus passed to the client driver 33, and sent via the USB interface 14 to the host 12 at an appropriate time.

Of the four pipes used by the USB interface and described above, status information can conceivably be sent by any of the following three transfer types: bulk transfer, interrupt transfer, and isochronous transfer.

A dedicated part of the USB bandwidth is reserved for isochronous transfers because of the need to minimize delay in order to assure isochrony. However, resending the data is not attempted even when data is lost, and data reliability is therefore not great. The isochronous transfer pipe is therefore not desirable for sending status information.

The bulk transfer pipe is well suited for communicating large amounts of data, but can only be opened when there is sufficient USB bandwidth available. Data transfer speed and timing are therefore not assured. Data reliability is high, however, because data receipt is confirmed by the handshake packet, and resending the data is attempted again at the next bulk transfer period when data is lost.

If the interrupt transfer period is set to the shortest possible interval for a given device, that device will be polled every frame F. Data can therefore be sent substantially immediately from the device to the host 12. The device also retries sending at the next period if data is lost, and data reliability is therefore high. It should be noted, however, that the USB standard gives priority to periodic access attempts such as interrupt transfers and isochronous transfers. This means that if the bandwidth allocated to interrupt transfers occupies too much of a frame F, it may not be possible to assure sufficient bandwidth for bulk transfer transactions. Print data transmission speed may therefore drop.

The client driver 33 in this exemplary printer 15 is therefore adapted to selectively use either the bulk transfer mode or the interrupt transfer mode. The client driver 33 can thus be considered as comprising two different transfer means or transfer functions: a first transfer function 34 for sending status information by bulk transfer mode, and a second transfer function 35 for sending status information by interrupt transfer mode. Status information is thus allocated to a particular transfer mode (pipe) for transmission to the host 12 according to the type of status information, thus achieving both immediate status information transmission when needed while assuring sufficient bandwidth for bulk transfers.

There are three reasons for the printer 15 to send status information to the host 12.

First, the printer 15 sends status information in response to a status request command, a control command from the host.

This status request command is temporarily buffered, similarly to print data and other normal control commands, and processed in the order received. Status information sent in response to this status request command is therefore of relatively low urgency, that is, immediacy, and can therefore be sent by bulk transfer mode without causing any problems.

Furthermore, because the status request command is sent from the host 12 to the printer 15, the host 12 is expecting the status information from the printer 15. As a result, the host 12 can, as necessary, obtain the status information at an appropriate timing by specifying the printer 15 address and sending an IN token 51. As a result, this exemplary printer 15 uses the bulk transfer mode, that is, first transfer function 34, for status information transmission.

Second, the printer 15 sends status information in response to a real-time status request command.

A real-time command sent from the host 12 and received by the printer 15 is processed before, or instead of, being stored in a buffer. Real-time commands are thus of high urgency, and are processed with priority over other commands and print data. It is therefore necessary for the printer 15 to send the status information to the host 12 at the earliest possible time.

Because the status request command is sent from the host 12, however, the host 12 in this case, too, can issue frequent IN tokens 51 to the USB in an attempt to obtain the status information. The host 12 can therefore control the transmission timing or speed even for status information sent by a device in response to an urgent real-time status request command. As a result, this exemplary printer 15 uses the bulk transfer mode, that is, first transfer function 34, even in response to real-time status request commands.

Third, the printer 15 initiates status information sending.

This function for initiating status information transfer is called an Auto Status Back function (ASB), and enables the printer 15 to automatically send specific status information to the host 12 when conditions (a particular change in printer status) predefined by the host 12 are met. For example, if a printer cover open status is the predefined condition, the printer generates the status information when the printer cover is opened for some reason, and sends this status information to the host 12.

This type of status information can lead to an unrecoverable error such as a loss of print data. Printing cannot continue if the cover is opened while printing is in progress or while print data is being sent from the host 12, for example, and it is therefore necessary to interrupt the print job. However, if the host continues to send print data while the job is interrupted, a print buffer overflow can occur, and data may be lost. It is therefore preferable for the printer 15 to send autonomously generated status information to the host 12 in real-time.

Moreover, the host 12 has no way of knowing when such autonomic status information may be generated, and therefore cannot send an IN token 51 at a suitable timing to fetch this status information from the printer 15. An exemplary printer 15 according to this preferred embodiment therefore uses a second transfer function 35 to send such autonomic status information to the host 12 via an interrupt transfer pipe. As described above, the interrupt transfer pipe polls the device every frame, if set to the shortest possible timing, and the printer 15 can therefore send such status information to the host 12 in substantially real-time.

Figure 5:
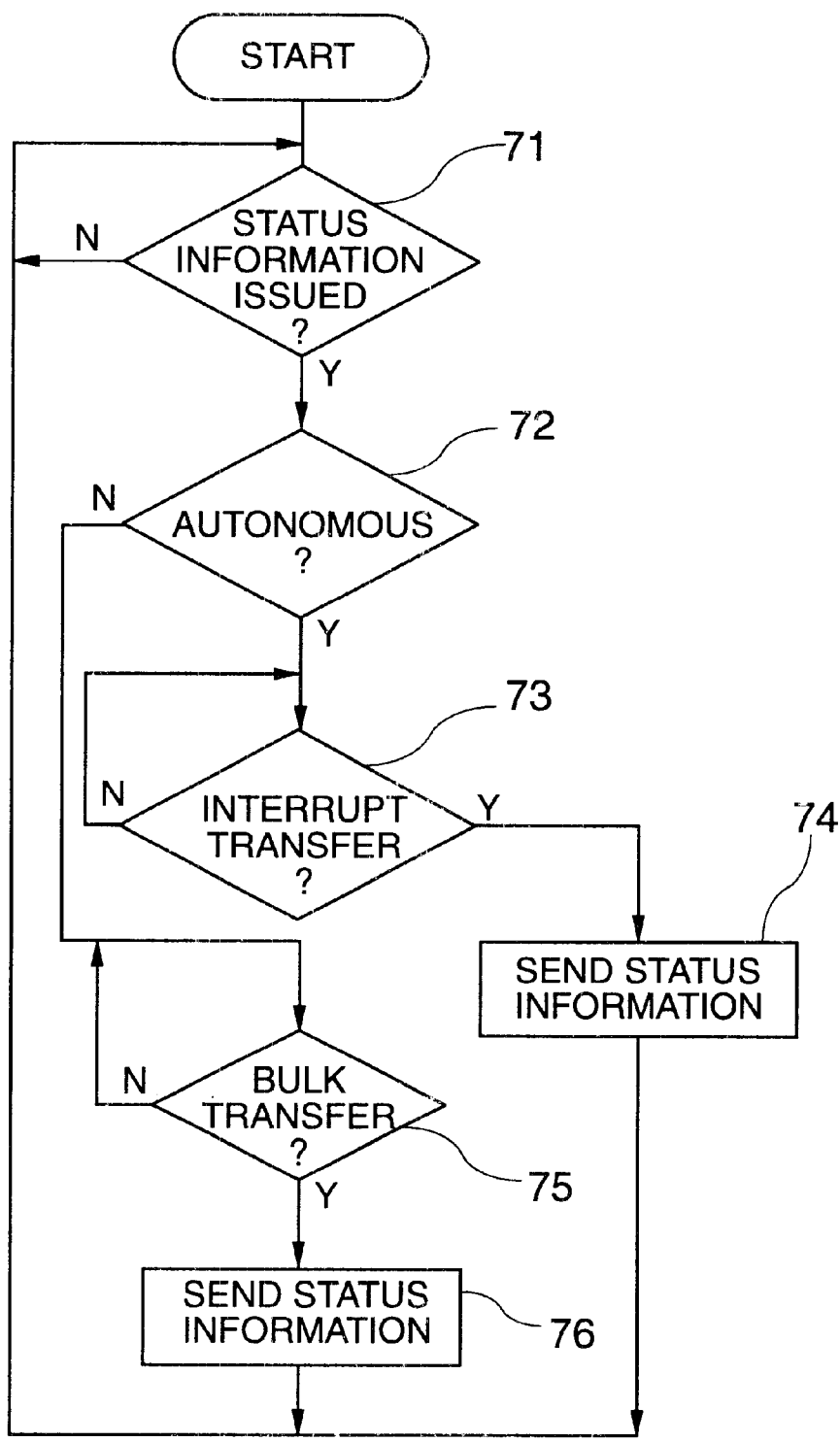
FIG. 5 is a flow chart of the basic status information transmission process of the printer shown in FIG. 1.

FIG. 5 is a flow chart of the major steps in a process whereby this exemplary printer 15 sends status information to the host.

When the process starts and the control device 32 produces status information (step 71), a decision is made in step 72 to determine whether the status information was autonomously generated, that is, if the status information was generated by the ASB function. If it is, an IN token for an interrupt transfer is detected (decision step 73). When an interrupt transfer pipe has been established, the status information is sent (step 74). As described above, the interrupt transfer period can be set to the shortest possible service period, that is, the frame period. With such setting, every frame is a chance for sending status information which essentially means ASB status information can be sent to the host 12 as soon as it is generated, i.e., in real-time.

However, if the status information did not originate from the ASB function as determined in decision step 72, the process skips from step 72 to step 75, which detects a bulk transfer pipe (decision step 75). When a bulk transfer IN token is detected, the status information is sent in step 76.

A printer 15 using a USB interface to send status information to a host according to this exemplary embodiment thus uses an interrupt transfer pipe to send autonomously generated (ASB function) status information to the host, and uses a bulk transfer pipe to send status information in response to status request commands from the host.

Urgent status information that is autonomously generated by the printer and that the host has no way of knowing when it will occur can therefore be sent in realtime by the printer to the host.

In addition, status information that is not urgent and for which the host can control the transfer timing can be sent using the bulk transfer pipe, thereby reducing the interrupt transfer load, preventing excess bandwidth from being occupied for interrupt transfers, and assuring sufficient bandwidth for bulk transfers.

It is therefore possible to provide by means of the present invention a printer and a printer control method whereby the immediate, real-time communication of status information can be assured while also assuring sufficient bandwidth capacity and a fast data transfer rate.

The control method shown in the flow chart in FIG. 5 may be embodied in a control program of instructions for executing each of the process steps. Such a control program may be recorded on a magnetic tape, magnetic disk, optical disc, or other machine readable recording medium such that the control program can be installed in ROM or other recording/storage medium in the printer for use by the printer.

It should be noted that the present invention has been described above using a printer by way of example only, and shall not be limited thereto. More specifically, the same processes and configuration can be used to send status information to a host from various other USB devices, including a customer display 16, card reader 17, and bar code scanner 18.

Status information requested by the host is also described above as being sent by bulk transfer mode, but it is also possible to send status information in response to urgent real-time status request commands by interrupt transfer mode to the host, and send only status information in response to normal (non-urgent) status request commands by bulk transfer mode. This method of sending status information still releases significantly more bandwidth than does using the interrupt transfer pipe to send all status information, and also assures the real-time transfer of status information responding to real-time status request commands.

USB, however, is a bus in which both sending and receiving timing are controlled by the host. It is therefore possible even using the bulk transfer mode for a device to send status information to the host at an appropriate timing in response to a request command from the host. The USB can therefore be optimally controlled to assure the immediacy of status information and maximize the transfer efficiency of other data by sending only autonomic status information, the timing of which cannot be controlled by the host, using the interrupt transfer pipe, and sending by bulk transfer pipe all other status information, the timing of which can be controlled by the host.

As will be understood from the above description, when a host and peripheral device are connected by a bus having a plurality of transfer modes for communication between the host and peripheral device, a peripheral device and control method therefor according to the present invention can send status information (or comparable information) to the host using either a first or a second transfer mode selected according to the nature of the information to be sent. The USB interface is exemplary of such a peripheral device and host connection device, and in this case the first transfer mode corresponds to a bulk transfer mode in which data sending and receiving are enabled based on an input/output command sent from the host when the transfer time has been reserved, and the second transfer mode corresponds to an interrupt transfer mode in which data sending and receiving are enabled based on an input/output command sent at a regular interval from the host.

As a result, the immediate, real-time transfer of autonomic status information, which occurs at a timing unknown to the host, can be assured by using the interrupt transfer mode, which has a short period. In addition, USB bandwidth can be freed for bulk transfers by using the bulk transfer mode to communicate status information sent in response to a request from the host. It is therefore possible by means of the present invention to provide a peripheral device and peripheral device control method whereby the timeliness of status information can be assured and the transfer efficiency of normal data can be increased.

While the invention has been described with reference to the accompanying drawings in conjunction with specific embodiments, many further alternatives, modifications and variations will be apparent to those skilled in the art in light of the foregoing description. Thus, the invention described herein is intended to embrace all such alternatives, modifications, applications and variations as may fall within the spirit and scope of the appended claims.

What is claimed is:

1. A peripheral device comprising:
a transmission unit for exchanging data with a host and for sending to the host status information indicative of an operating condition of the peripheral device, the transmission unit comprising:
an interface for sending data to and receiving data from the host by at least two transfer modes including,
a first transfer mode in which data sending and receiving are enabled based on an input/output command sent from the host when transfer time has been reserved, and
a second transfer mode in which data sending and receiving are enabled based on an input/output command sent at a regular interval from the host;
wherein the status transmission unit has a first transfer function for sending status information by the first transfer mode, a second transfer function for sending status information by the second transfer mode, and a selecting function for selecting the first or second transfer function according to a cause for sending the status information.

2. The peripheral device as set forth in claim 1, wherein the first transfer function sends status information based on a request from the host, and the second transfer function sends autonomous status information.

3. The peripheral device as set forth in claim 1, further comprising a processing mechanism for outputting data to or inputting data from an external source; and wherein the interface further comprises a controller for sending or receiving by the first transfer mode data processed by the processing mechanism.

4. The peripheral device as set forth in claim 1, wherein the interface is a Universal Serial Bus (USB) interface, the first transfer mode is a bulk transfer mode, and the second transfer mode is an interrupt transfer mode.

5. The peripheral device as set forth in claim 1, wherein the interface further comprises a first driver having first and second transfer units which respectively support the first and second transfer modes.

6. The peripheral device as set forth in claim 1, wherein the transmission unit further comprises a second driver in which the first and second transfer functions are embodied.

7. A peripheral device control method comprising:
a detecting step for detecting status information indicative of an operating condition of the peripheral device;
a selecting step for selecting a first transfer mode or a second transfer mode according to a cause for sending status information to a host, wherein, in the first transfer mode, data sending and receiving are enabled in response to an input/output command sent from the host when transfer time has been reserved, and, in the second transfer mode, data sending and receiving are enabled in response to an input/output command sent at a regular interval from the host;
a first status transfer step for sending status information to the host by means of the first transfer mode if the first transfer mode is selected in said selecting step; and
a second status transfer step for sending status information to the host by means of the second transfer mode if the second transfer mode is selected in said selecting step.

8. The peripheral device control method as set forth in claim 7, wherein the first status transfer step sends status information based on a request from the host, and the second status transfer step sends autonomous status information.

9. The peripheral device control method as set forth in claim 7, further comprising:
a process data communication step for sending or receiving by the first transfer mode data processed by a processing mechanism for outputting data to or inputting data from an external source.

10. The peripheral device control method as set forth in claim 7, wherein the first transfer mode is a bulk transfer mode supported by a Universal Serial Bus (USB) interface, and the second transfer mode is an interrupt transfer mode supported by the Universal Serial Bus (USB) interface.

11. A machine readable medium embodying a program of instructions for execution by the device to perform a peripheral device control method, the program comprising instructions for:

a detecting process for detecting status information indicative of an operating condition of the peripheral device;

a selecting process for selecting a first transfer mode or a second transfer mode according to a cause for sending status information to a host, wherein, in the first transfer mode, data sending and receiving are enabled in response to an input/output command sent from the host when transfer time has been reserved, and, in the second transfer mode, data sending and receiving are enabled in response to an input/output command sent at a regular interval from the host;

a first status transfer process for sending status information to the host by means of the first transfer mode if the first transfer mode is selected in said selecting process; and a second status transfer process for sending status information to the host by means of the second transfer mode if the second transfer mode is selected in said selecting process.

12. The machine readable medium embodying a program of instructions as set forth in claim 11, wherein the instructions for the first status transfer process include instructions for sending status information based on a request from the host, and the instructions for the second status transfer process include instructions for sending autonomous status information.

13. The machine readable medium embodying a program of instructions as set forth in claim 11, the program further comprising instructions for:

executing a process data communication process for sending or receiving by the first transfer mode process data processed by a processing mechanism for outputting data to or inputting data from an external source.

14. The machine readable medium embodying a program of instructions as set forth in claim 11, wherein the instructions for the first status transfer process include instructions for executing the first process using a bulk transfer mode supported by a Universal Serial Bus (USB) interface as the first transfer mode, and the instructions. for the second status transfer process include instructions for executing the second process using an interrupt transfer mode supported by the Universal Serial Bus (USB) interface.

* * * * *